(12) United States Patent
Saito et al.

(10) Patent No.: US 8,388,061 B2
(45) Date of Patent: Mar. 5, 2013

(54) DISPLAY DEVICE OF VEHICLE SEAT

(75) Inventors: Yuko Saito, Toyota (JP); Satoru Kuno, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 395 days.

(21) Appl. No.: 12/755,545

(22) Filed: Apr. 7, 2010

(65) Prior Publication Data

US 2010/0259078 A1    Oct. 14, 2010

(30) Foreign Application Priority Data

Apr. 8, 2009 (JP) ................................ 2009-093933

(51) Int. Cl.
*A47C 31/00* (2006.01)

(52) U.S. Cl. ............. 297/217.3; 297/188.21; 297/217.5; 297/217.1

(58) Field of Classification Search ............... 297/217.3, 297/217.5, 217.6, 217.1, 188.04, 188.05, 297/188.21; 248/284.1; 345/87, 905
See application file for complete search history.

(56) References Cited

U.S. PATENT DOCUMENTS

| | | | |
|---|---|---|---|
| 7,036,936 B2 | 5/2006 | Hattori et al. | |
| 7,261,266 B2 * | 8/2007 | Satterfield | 248/284.1 |
| 7,510,241 B2 * | 3/2009 | Nathan et al. | 297/217.3 |
| 7,959,226 B2 * | 6/2011 | Hattori et al. | 297/217.3 |
| 8,141,948 B2 * | 3/2012 | Cassellia et al. | 297/217.3 |
| 2005/0140845 A1 * | 6/2005 | Huang | 349/58 |
| 2008/0203788 A1 * | 8/2008 | Hattori et al. | 297/217.3 |
| 2009/0008974 A1 | 1/2009 | Hattori et al. | |
| 2009/0085383 A1 * | 4/2009 | Hicks et al. | 297/217.3 |
| 2009/0174238 A1 | 7/2009 | Kuno | |

FOREIGN PATENT DOCUMENTS

JP    2005-77716    3/2005

* cited by examiner

*Primary Examiner* — Laurie Cranmer
(74) *Attorney, Agent, or Firm* — Greenblum & Bernstein, P.L.C.

(57) ABSTRACT

A display device includes: a display; and a slide mechanism including: a motor that is configured to move the display between a stored position and a use position, the display being stored in a case member of the display device in the stored position, the display being ejected outside of the case in the use position; and a grappling member, which is configured to engage with a member to be grappled, in the use position, wherein the display is tilted when the grappling member is engaged with the member to be grappled in the use position.

12 Claims, 7 Drawing Sheets

DISPLAY DEVICE OF VEHICLE SEAT

CROSS REFERENCE TO RELATED APPLICATION

The present application claims priority from Japanese Patent Application No. 2009-093933, which was filed on Apr. 8, 2009, the disclosure of which is herein incorporated by reference in its entirety.

TECHNICAL FIELD

The apparatuses and devices consistent with the present invention relate to a display device in a vehicle seat. More specifically, the present invention relates to a display device in a vehicle seat, having a slide mechanism including a slide base which can be slid between the inside and the outside of a seat back, and a display which is assembled to the slide base via a hinge, the display being able to be tilted toward the head rest side via the hinge when the display has been slid to the outside of the seat back.

BACKGROUND

There is a related art vehicle seat that includes a display on the rear surface side of the seat back of a front seat (for example, the driver's seat or the passenger seat) for an occupant who sits in a rear seat (hereinafter, referred to simply as "occupant"). This display is able to be stored in the inside of the seat back in a state of being substantially parallel to a back frame and be ejected (pulled out) by a slide to the rear surface side position of the head rest which is outside of the seat back. When the display is ejected, the display is able to be tilted toward a rear surface side of the head rest. Accordingly, the display does not lie in the way when the display device is not used, and the display can be simply pulled out when the display device is used. In addition, it is possible to incline the display by tilting to a state in which it can be easily seen by the occupant.

Furthermore, there is a related art document of the present invention (See, Patent Document 1).

Patent Document 1: JP-A-2005-77716

SUMMARY

However, in the above described related art, the display performs sliding and tilting, and thus the display device needs at least two driving sources as the driving source for such two operations.

The present invention is made to solve the above disadvantage, and its object is to provide a display device in a vehicle seat which can perform the sliding and tilting of the display by one driving source.

The present invention is to accomplish the above object. Therefore, according to an illustrative aspect of the present invention, there is provided a display device of a vehicle seat, comprising: a slide mechanism that is configured to slide a display between an inside and an outside of a seat back and configured to tilt the display that is slid outside of the seat back.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, a description for carrying out an aspect of the invention will be given with reference to FIGS. 1 to 7. Furthermore, in the following description, the terms of upper, lower, front, rear, left and right refer to the upper, lower, front, rear, left and right directions indicated in the above described drawings, i.e., the upper, lower, front, rear, left and right directions when taking a vehicle seat 1 as a reference.

Figure 1:
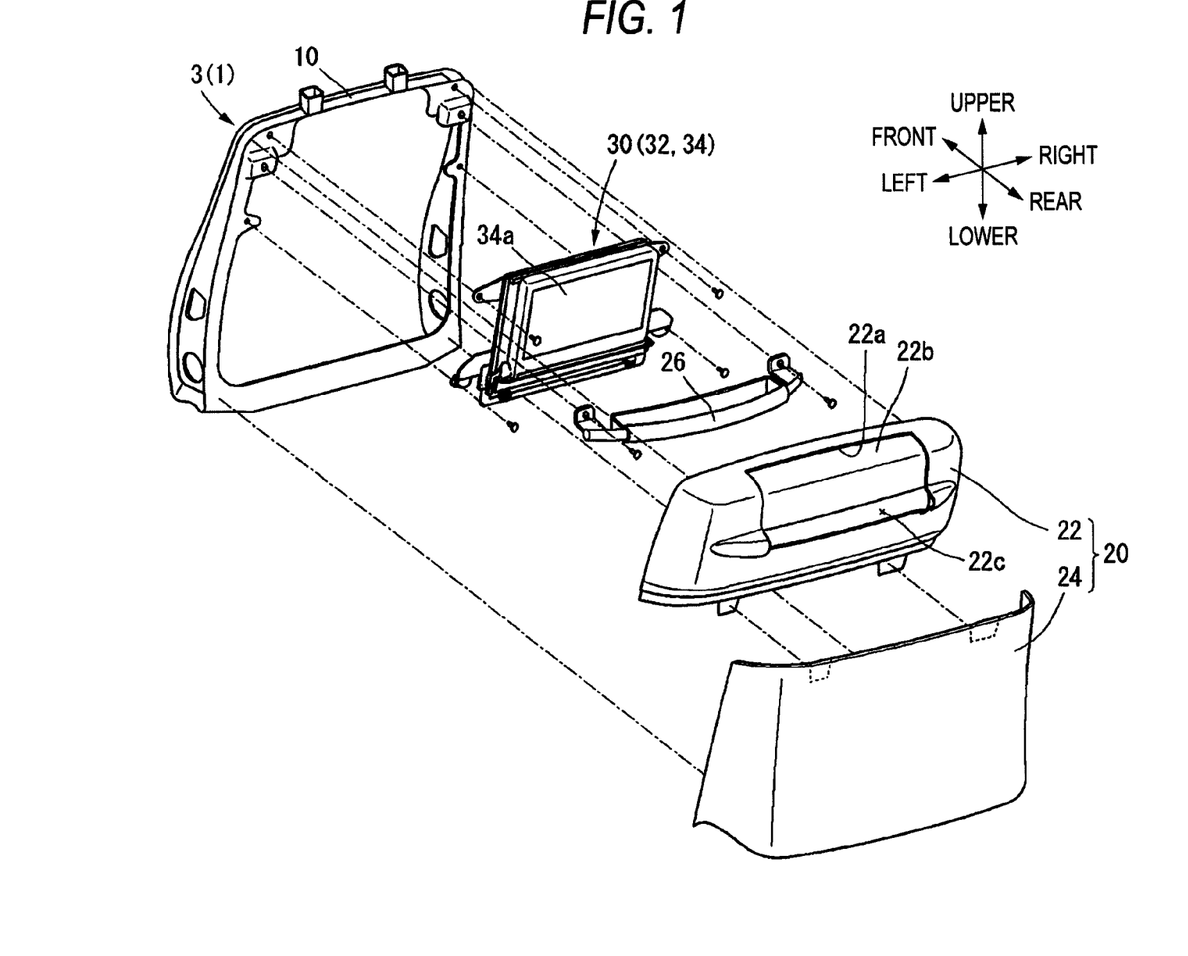
FIG. 1 is an exploded perspective view of a rear surface side of a seat back of the vehicle seat with a display device according to an exemplary embodiment.
Figure 2:
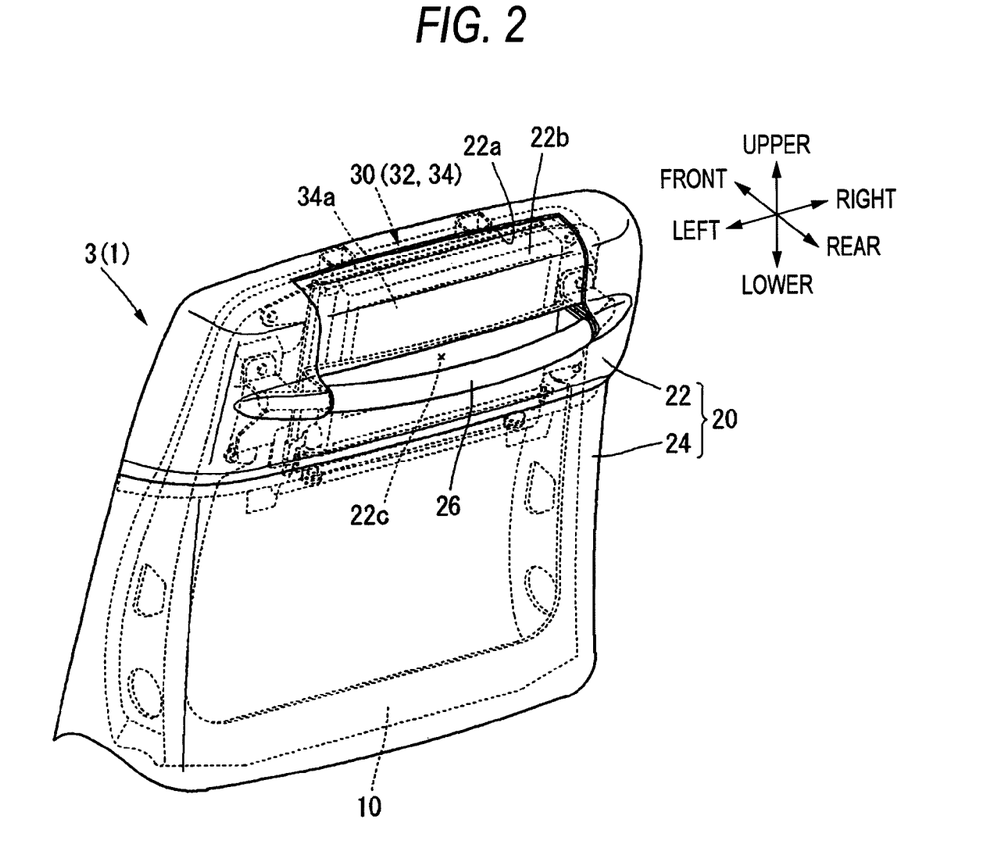
FIG. 2 is a perspective view showing an assembled state of FIG. 1.
Figure 3:
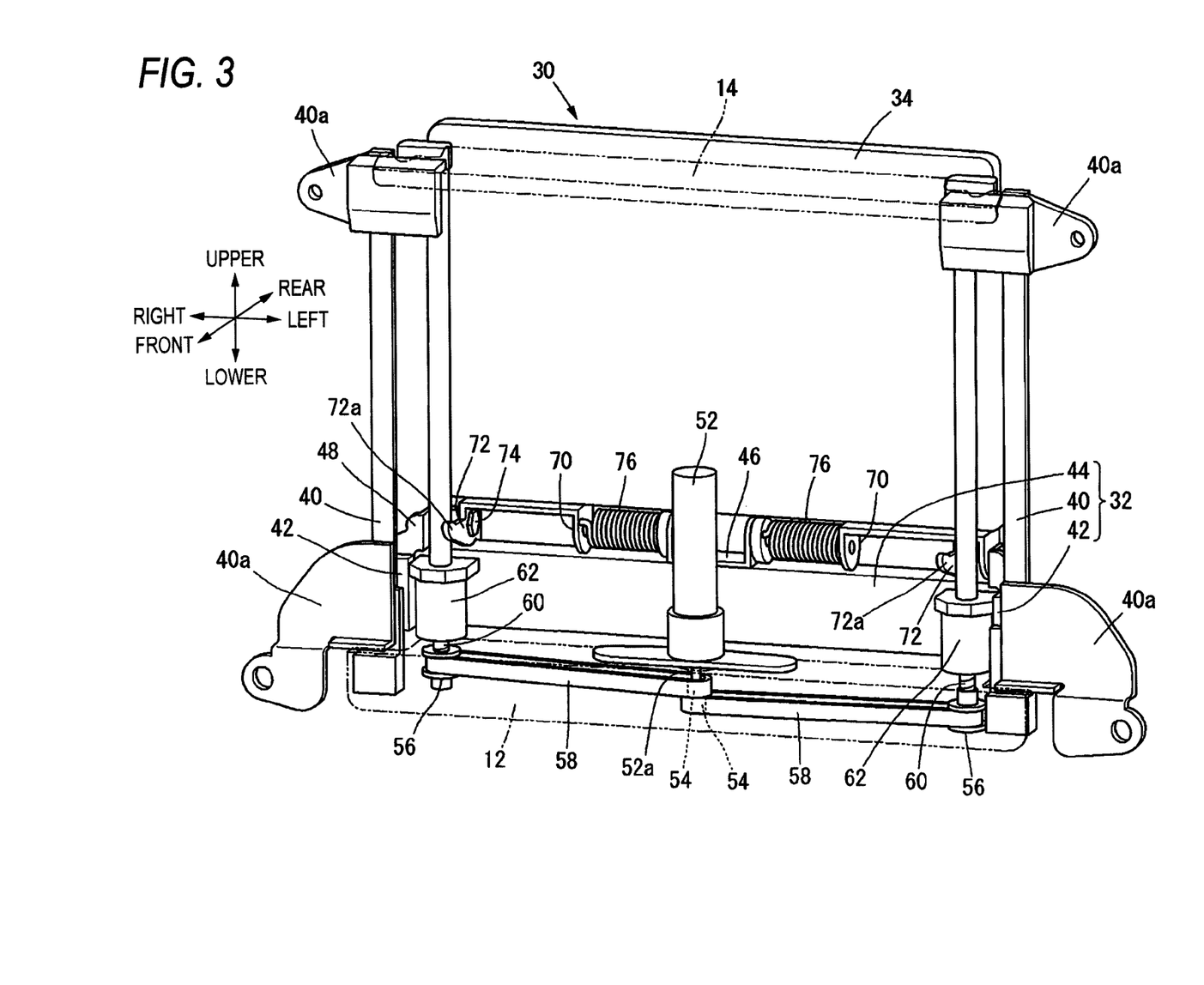
FIG. 3 is an overall perspective view showing the display device of FIG. 1 from rear surface side.

First, the configuration of a display device 30 of a vehicle seat 1 according to an exemplary embodiment of the invention will be described with reference to FIGS. 1 to 3. The display device 30 has a slide mechanism 32 and a display 34 which is able to be slid by the slide mechanism 32. The display 34 is assembled through the slide mechanism 32 to a back frame 10 of the seat back 3 in a state in which a monitor 34a of the display 34 faces to the rear surface side of the seat back 3. Next, a backboard 20 which forms a design surface of the vehicle seat 1 is assembled to the rear surface of the back frame 10. This allows the display device 30 to be stored in the seat back 3 with a good appearance.

The backboard 20 has, for example, an upper backboard 22 and a lower backboard 24 which are vertically divided. A first opening 22a, which can advance or retreat the display 34 of the display device 30 by sliding it, is formed on an upper end of the upper backboard 22. In addition, a cover 22b for opening or closing the first opening 22a is attached to the upper backboard 22. Moreover, a second opening 22c through which an assist grip 26 assembled to the back frame 10 via screws passes is also formed on the upper backboard 22.

Next, a detailed configuration of the slide mechanism 32 and the display 34 as described above will be respectively described. First, the detailed configuration of the slide mechanism 32 will be described. The slide mechanism 32 has a pair of right and left guide rails 40 and 40, sliders 42 and 42 which freely slide on the pair of right and left guide rails 40 and 40, and a rectangular slide base 44 which is fixed to both of the sliders 42 in a state of connecting both of the sliders 42.

The pair of right and left guide rails 40 and 40 is fixed to an upper portion of the back frame 10 along its vertical direction via the mounting brackets 40a and 40a and screws. Therefore, it is possible to slide the slide base 44 vertically between the inside of the seat back 3 and the rear surface side of the head rest 4 which becomes the outside of the seat back 3. A hinge bracket 46 formed in a substantially U-shape corresponding to a hinge bracket 70 formed in the display 34 which will be described later is fixed at the center in the width direction on an upper surface of the slide base 44.

In addition, the brackets 48, to which pins 74a of torque hinges 74 which will be described later are inserted and fixed, are respectively fixed onto both the right and left ends on an upper surface of the slide base 44. Furthermore, a pair of right and left ball nuts 62 and 62 is fixed to both the right and left ends in the rear surface of the slide base 44.

Next, the driving source of the slide mechanism 32 will be described. A motor mount 12 is assembled to the back frame 10 substantially at the rear surface side of the slide base 44. A motor 52 is assembled to the motor mount 12 with its rotating shaft 52a facing downwards. Two transmitting pulleys 54 and 54 are fixed to the rotating shaft 52a of the motor 52.

On the other hand, onto the upper portion of the back frame 10, a pair of right and left ball screws 60 and 60 is assembled so as to be arranged parallel to the pair of right and left guide rails 40 and 40. The pair of right and left ball screws 60 and 60 is assembled at its tops and bottoms via bearings or the like (not shown) so that it can be rotated about axes. Also, on the pair of right and left ball screws 60 and 60, a pair of right and left ball nuts 62 and 62, which is fixed to the slide base 44, is screw-engaged, respectively.

In addition, receiving pulleys 56 and 56 are fixed onto the pair of right and left screws 60 and 60. Belts 58 and 58 are looped around both the receiving pulleys 56 and 56 and both the transmitting pulleys 54 and 54, respectively. When the rotating shaft 52a of the motor 52 rotates, its rotating force rotates the pair of right and left ball screws 60 and 60 via both of the transmitting pulleys 54 and 54, both of the belts 58 and 58, and both of the receiving pulleys 56 and 56. Accordingly, the pair of right and left ball nuts 62 and 62 slides. Therefore, it is possible to slide the slide base 44 fixed to the pair of right and left ball nuts 62 and 62 along the pair of right and left guide rails 40 and 40.

Furthermore, the motor 52 is adapted to be electrically connected to a control device (not shown) and be driven due to various operations (for example, a switch operation by occupant or the like). In addition, it is possible to rotate the rotating shaft 52a of the motor 52 in either of the forward or backward directions. Accordingly, it is possible to raise or lower the slide base 44. Also, if the slide base 44 reaches an upper end and a lower end of the pair of right and left guide rails 40 and 40, a limit switch or the like (not shown) can detect it. This detected signal performs an electrical control of stopping the drive of the motor 52. The slide mechanism 32 is configured as mentioned above.

Subsequently, a detailed configuration of the display 34 will be described. At right and left of the lower surface of the display 34, as described above, the hinge brackets 70 corresponding to the hinge bracket 46 of the slide base 44 are fixed, respectively. Hinge pins (not shown) are mounted to both of the hinge brackets 46 and 70, respectively. That is, the hinge pins are respectively mounted to both of the hinge brackets 46 and 70 via torsion springs 76 and 76 so as to cause the display 34 to be biased in a direction to fall down forward. This structure allows the display 34 to be tilted with respect to the slide base 44 in a state of being biased in a direction to fall down forward.

In addition, at both right and left ends in the lower surface of the display 34, grappling claws 72 projecting toward the rear surface side of the display 34 are respectively formed. The grappling claws 72 are formed in a substantially hook shape and are formed to interfere with a member to be grappled 14 which is fixed to an upper portion of the back frame 10 when the display 34 is slid to outside of the seat back 3 by sliding the slide base 44 from inside of the seat back 3 to outside.

In addition, although the member to be grappled 14 is formed on the back frame 10 according to the exemplary embodiment, the member to be grappled 14 may be formed in a part of the display device 30.

In addition, a torque hinge 74 is fixed to the grappling claw 72. The torque hinge 74 is a pin which rotates in a state in which the pin 74a has a large resistance with respect to the main body of the torque hinge. The torque hinge 74 is fixed to the grappling claw 72 as described above in a state in which its pin 74a is fitted into the bracket 48 of the slide base 44. That is, the torque hinge 74 is fixed to the grappling claw 72 so as to be arranged on the same axis as that of the hinge pins of both of the hinge brackets 46 and 70. Therefore, it is possible to prevent a non-smooth hinge operation by both of the hinge brackets 46 and 70.

Furthermore, the monitor 34a of the display 34 is also electrically connected to the control device (not shown), and can display various images (for example, a television image, a recorded image or the like) due to various operations (for example, a switch operation by occupant, a driving of motor 52 and the like). The display 34 is configured as described above.

Lastly, with reference to FIGS. 4 to 7, action of the display device 30 having the slide mechanism 32 and the display 34 as described above will be described. First, a case of switching from a stored state in which the display 34 is stored in the seat back 3 to a use state in which the display 34 is slid outside of the seat back 3 will be described. Furthermore, in this stored state, the display 34 comes to a state of being substantially parallel to the slide base 44.

Figure 4:
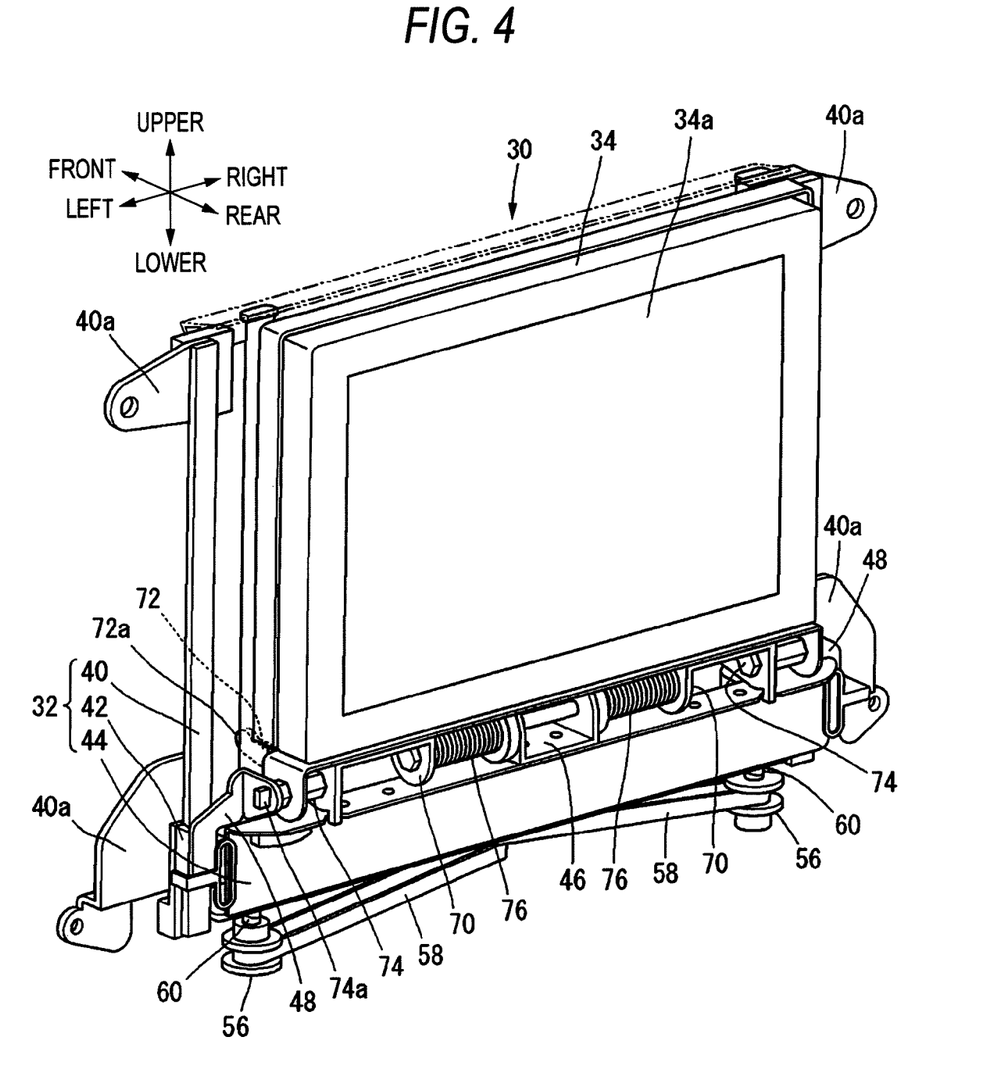
FIG. 4 is an overall perspective view showing a state in which the display device is stored in the seat back.
Figure 7:
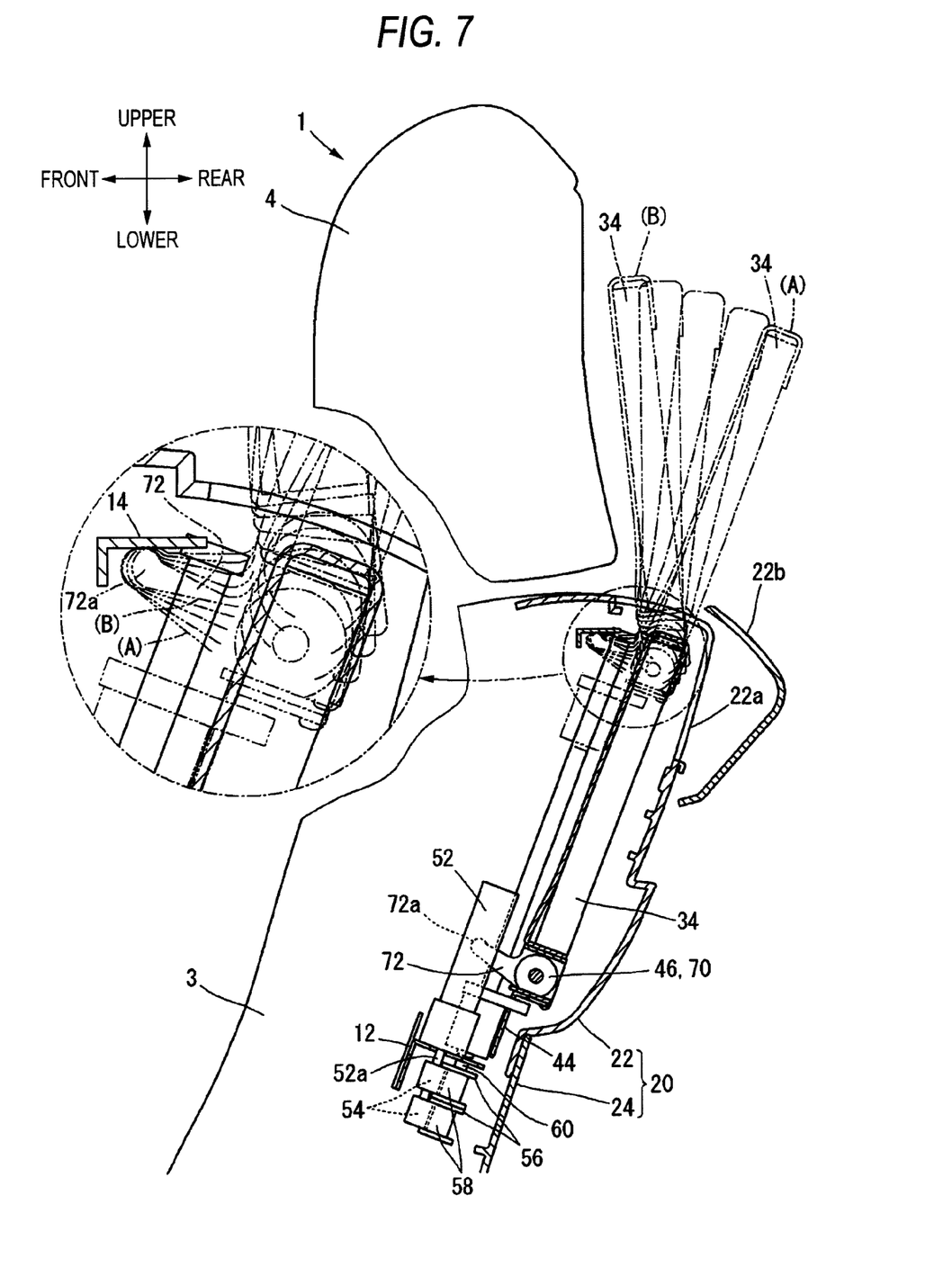
FIG. 7 is a longitudinal sectional view of FIG. 4.

First, in a state shown in FIGS. 4 and 7, the occupant performs an operation to open a cover 22b of the backboard 20. Next, the occupant performs a switch (not shown) operation to raise the display 34. Then, as described already, the slide base 44 is raised due to driving of the motor 52. Accordingly, the display 34 which is assembled via the slide base 44 and both of the hinge brackets 46 and 70 is also raised.

Figure 5:
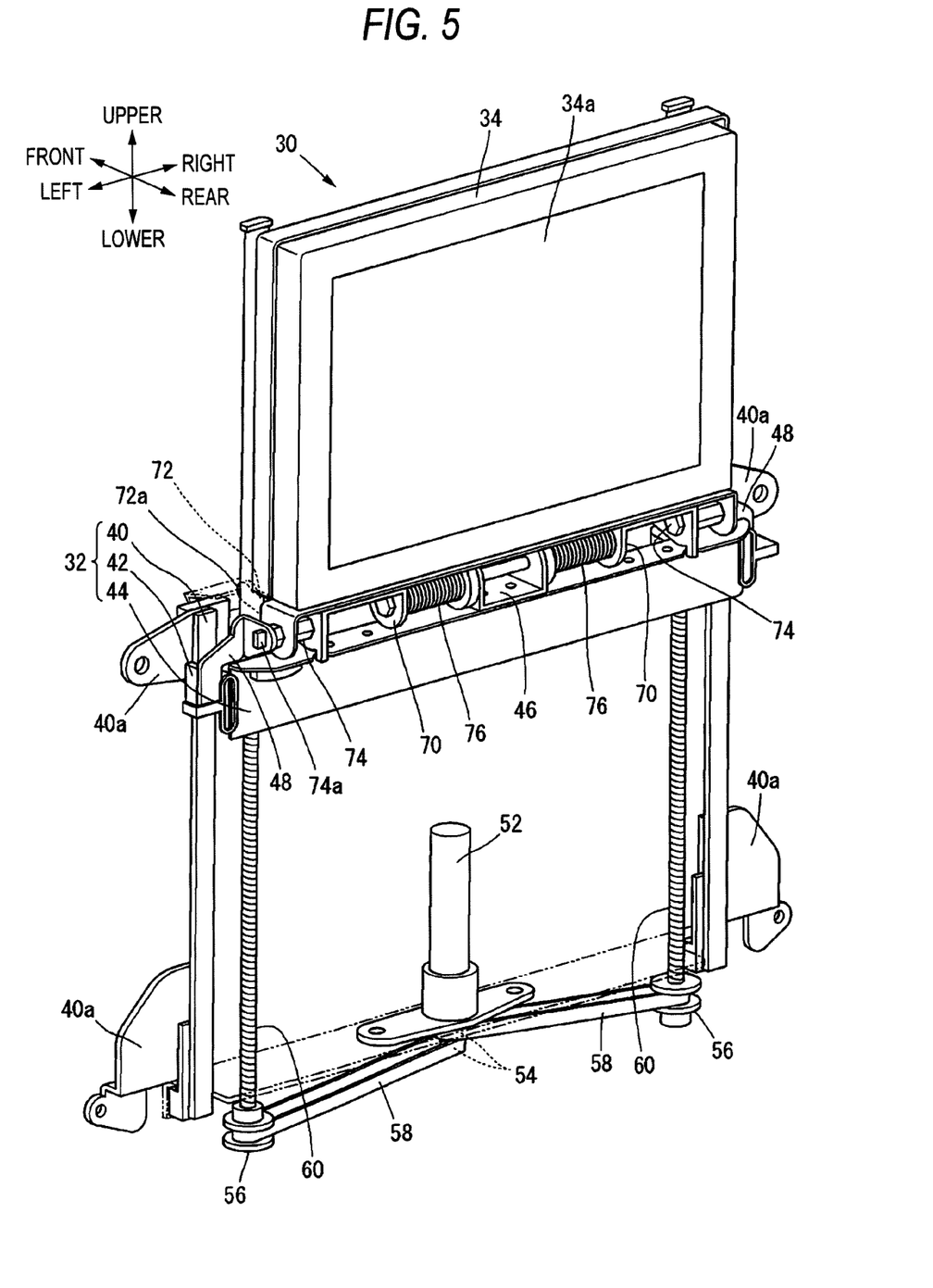
FIG. 5 is a perspective view showing a state in which the display device of FIG. 4 is slid to outside of the seat back.

Then, when the display 34 is slid to outside of the seat back 3, the grappling claw 72 of the display 34 starts to interfere with the member to be grappled 14 of the back frame 10 (refer to an imaginary line A in FIGS. 5 and 7). Next, in this interference state, when the slide base 44 is raised further, the grappling claw 72 rotates with respect to the slide base 44 with its tip 72a facing downwards. Accordingly, the display 34 which is integral with the grappling claw 72 also tilts toward the head rest 4 side (rotates in the direction to fall down backward) via both of the hinge brackets 46 and 70.

According to the exemplary embodiment, although the member to be grappled 14 is a part of the back frame 10, this invention is not limited to this example. That is, the grappling claw 72 of the display 34 can interfere with a part of a case member of the display 34. (For example, the case member of the display 34 can be a part of the seat back 3 or a part of the ceiling wall of the vehicle etc. . . . .)

That is, even if the grappling claw 72 and the member to be grappled 14 begin to interfere with each other, the slide base 44 is still able to be raised. However, since the display 34 is raised in a state in which the grappling claw 72 is grappled on the member to be grappled 14, the display 34 tilts toward the side of the head rest 4 along with its raising. At this time, the display 34 tilts against the biasing force of the torsion spring 76 and against a rotation resistance acting on the torque hinge 74.

Figure 6:
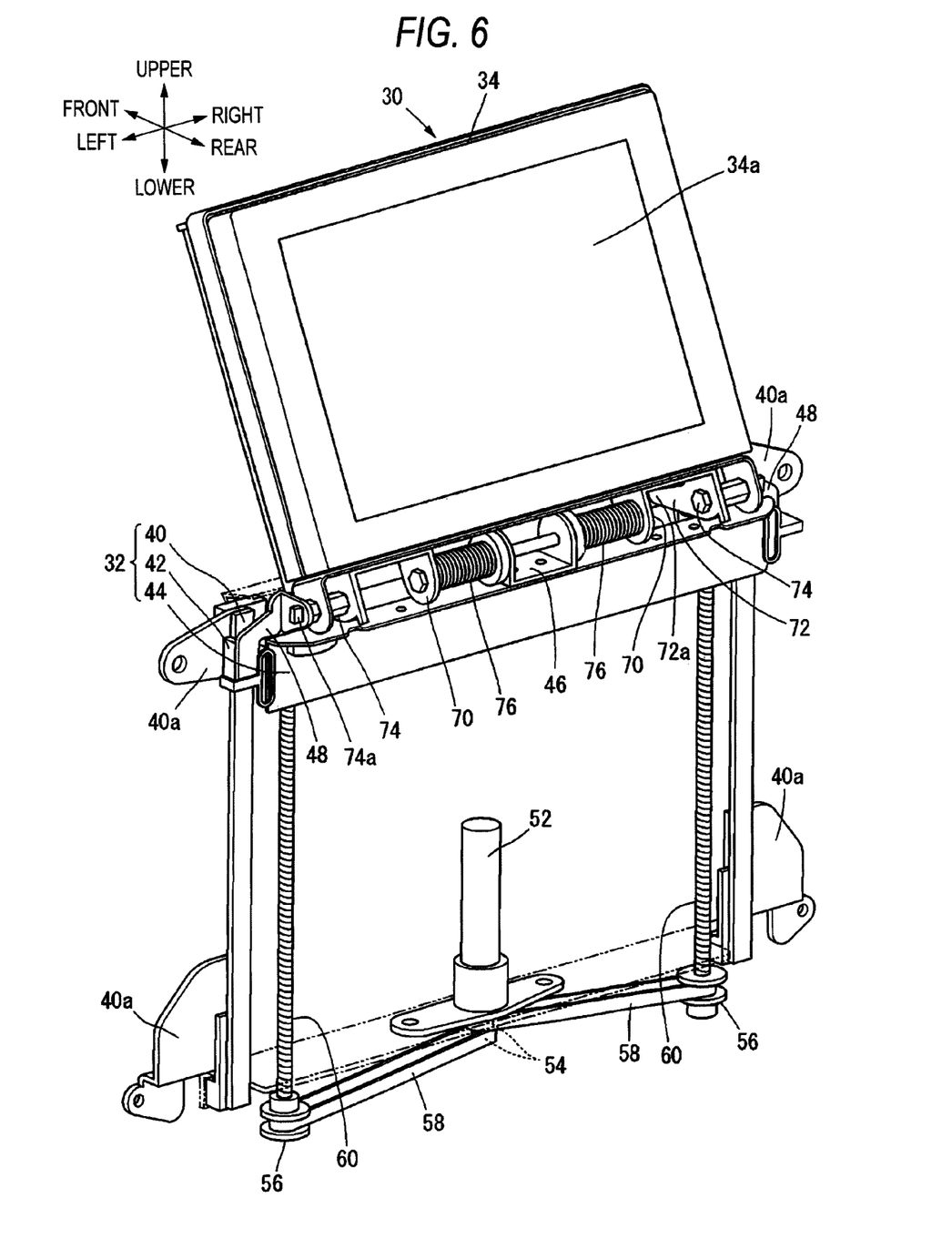
FIG. 6 is a perspective view showing a state in which the display device of FIG. 5 is tilted.

Then, since the driving of the motor 52 is stopped when the slide base 44 reaches the upper ends of the pair of right and left guide rails 40 and 40, the display 34 is held in this state along with the slide base 44 (refer to the imaginary line B in FIGS. 6 and 7). In this state, the occupant may release the switch operation. As a result, it is possible to switch the display 34 to a use state in which the display 34 is slid to outside of the seat back 3.

Next, contrary to the above description, a case of switching from a use state in which the display 34 is slid to outside of the seat back 3 to a stored state in which the display 34 is stored in the seat back 3 will be described. In this case, an operation contrary to the above description is performed.

First, in a state shown in FIG. 6, the occupant performs a switch (not shown) operation to lower the display 34. Then, as described already, the slide base 44 is lowered due to driving of the motor 52. Accordingly, the display 34 which is assembled via the slide base 44 and both of the hinge brackets 46 and 70 is also lowered.

That is, the grappling claw 72 rotates with respect to the slide base 44 with its tip 72a facing upwards. Accordingly, the display 34 which is integral with the grappling claw 72 also tilts to the side opposite to the head rest 4 (rotates in a direction of falling down forward) via both of the hinge brackets 46 and 70. At this time, the display 34 tilts by the biasing force of the torsion spring 76 and against a rotating resistance acting on the torque hinge 74.

Then, when the display 34 starts to be stored in the seat back 3, interference between the grappling claw 72 of the display 34 and the member to be grappled 14 of the back frame 10 is released, and thus the display 34 returns to a state of being substantially parallel to the slide base 44 (refer to the imaginary line A in FIGS. 5 and 7). Further, since driving of the motor 52 is stopped when the slide base 44 is lowered and reaches the lower end of the pair of right and left guide rails 40 and 40, the display 34 is held in this state along with the slide base 44. In addition, in this state, the occupant may perform an operation to release the switch operation and close the cover 22b (refer to FIG. 4). As a result, it is possible to return the display 34 to a stored state in which the display 34 is stored in the seat back 3.

The display device 30 of a vehicle seat 1 according to the exemplary embodiment of the invention is configured as described above. With this configuration, the slide mechanism 32, which can slide the display 34 between an inside and an outside of the seat back 3 and tilt the display 34 that is slid to outside of the seat back 3, is provided. Therefore, it is possible to perform the sliding and tilting operations of the display 34 by one driving source (in this case, the motor 52).

In addition, with this configuration, when the display 34 reaches an outside of the seat back 3 during the sliding of the slide base 44 from inside of the seat back 3 to outside thereof, the display 34 tilts toward the head rest 4 side. Therefore, only with an operation to slide the slide base 44, it is possible to tilt the display 34 as well. Accordingly, it is possible to perform the sliding and tilting operations of the display 34 by one driving source (in this case, the motor 52).

In addition, with this configuration, the display 34 is assembled with respect to the slide base 44 in a state of being biased to a side opposite to the head rest 4 via the torsion spring 76. Therefore, when tilting the display 34 toward the head rest 4 side, it is possible to tilt the display 34 against the biasing force of the torsion spring 76. Accordingly, it is possible to tilt the display 34 without a non-smooth operation.

In addition, with this configuration, the display 34 is assembled with respect to the slide base 44 via the torque hinge 74. Therefore, it is possible to tilt the display 34 without non-smooth operation.

The foregoing relates to one exemplary embodiment of the present invention to the end, and does not imply that the invention is limited to the above description. In the embodiment, a motor 50 is described as an example of the driving source of the slide mechanism 32. That is, a configuration in which by rotation of the rotation shaft 52a of the motor 50, the slide base 44 is slid via the transmitting pulley 54, the belt 58, the receiving pulley 56, the ball screw 60 and the ball nut 62 is described. However, the present invention is not limited to such a configuration, and a configuration in which the slide base 44 is slid via various driving sources (for example, a motor cylinder, an air cylinder) and various power transmitting mechanisms (a decelerator) may be adopted.

In addition, although an example in which the occupant releases a switch operation after the slide base 44 reaches the upper ends of the pair of right and left guide rails 40 and 40 is described in the above embodiment, the present invention is not limited to this example. For example, the occupant may release the switch operation before the slide base 44 reaches upper ends of the pair of right and left guide rails 40 and 40. Although tilt amount of the display 34 becomes small in this case, for example, if the occupant is a child, it is possible to make the display 34 be easy to see.

In addition, although the display device of the above exemplary embodiment is stored in the seat back 3, the present invention is not limited to this example. For example, the display device is stored in the other components of the vehicle such as a head rest or a ceiling wall of the vehicle.

As described above, according to a first aspect of the present invention, there is provided a display device of a vehicle seat, comprising: a slide mechanism that is configured to slide a display between an inside and an outside of a seat back and configured to tilt the display that is slid outside of the seat back.

With this configuration, it is possible to perform the sliding and tilting of the display by one driving source.

According to a second aspect of the present invention, there is provided a display device, comprising: a display; and a slide mechanism including: a motor that is configured to move the display between a stored position and a use position, the display being stored in a case member of the display device in the stored position, the display being ejected outside of the case in the use position; and a grappling member, which is configured to engage with a member to be grappled, in the use position, wherein the display is tilted when the grappling member is engaged with the member to be grappled in the use position.

According to a third aspect of the present invention, in addition to the second aspect, the member to be grappled is formed in the case member of the display device.

According to a fourth aspect of the present invention, in addition to the second aspect, the member to be grappled is a part of the case member.

According to a fifth aspect of the present invention, in addition to the second aspect, the member to be grappled is formed on a part of the display device.

According to a sixth aspect of the present invention, there is provided a display device of a vehicle seat, comprising: a slide mechanism that includes a slide base that is configured to be movable between an inside and an outside of a seat back; and a display that includes a monitor that is assembled to the slide base via a hinge, wherein the display is able to be tilted toward a head rest side via the hinge when at least the display is slid to outside of the seat back, wherein the display further comprises a grappling claw that projects toward a side opposite to the monitor of the display, and wherein when at least the display is slid to outside of the seat back by being slid from the inside of the seat back to the outside thereof, the grappling claw of the display interferes with a part of the seat back, and with the interference state, when the slide base is further slid from the inside of the seat back to the outside thereof, the display is tilted with respect to the slide base toward the head rest side by operation of the hinge accompanied with the interference.

With this configuration, it is possible to tilt the display as well by only sliding the slide base. Therefore, it is possible to perform the sliding and tilting of the display by one driving source.

According to a seventh aspect of the present invention, in addition to the sixth aspect, the display is assembled to the slide base in a state of being biased toward a side opposite to the head rest.

With this configuration, it is possible to tilt the display toward the head rest side, for example against a biasing force of a torsion spring. Therefore, it is possible to tilt the display smoothly.

What is claimed is:

1. A display device of a vehicle seat, comprising:
    a slide mechanism that slides a display between an inside and an outside of a seat back and biases the display to tilt toward a use position while the display is being slid outside of the seat back.

2. The display device according to claim 1, the slide mechanism further comprising:
    a slide base configured to slide the display toward the use position, wherein the display is slidable and tiltable when the slide base is moved in a single direction.

3. The display device according to claim 1, wherein an axis around which the display is tilted is slidable by the sliding mechanism.

4. A display device, comprising:
    a display disposable in a case member of the display device and configured to be moved between a stored position within the case member and a use position outside of the case member; and
    a slide mechanism including:
        a motor that is configured to move the display between the stored position and the use position; and
        a grappling member which is configured to engage with a member to be grappled when the display is moved from the stored position to the use position,
    wherein the display is pivotally connected to the slide mechanism and biased toward the use position such that while the slide mechanism slides the display toward the use position, the grappling member engages the member to be grappled tilt the display toward the use position.

5. The display device according to the claim 4, wherein the member to be grappled is provided in the case member of the display device.

6. The display device according to claim 4, wherein the member to be grappled is a part of the case member of the display device.

7. The display device according to claim 4, the slide mechanism further comprising:
    a slide base configured to slide the display toward the use position, wherein the display is slidable and tiltable when the slide base is moved in a single direction.

8. The display device according to claim 4, wherein an axis around which the display is tilted is slidable by the sliding mechanism.

9. A display device of a vehicle seat, comprising:
    a slide mechanism that includes a slide base that is configured to be movable between an inside and an outside of a seat back; and
    a display that includes a monitor that is assembled to the slide base via a biased hinge,
    wherein the display is configured to be tilted toward a head rest side via the biased hinge while the display is slid to outside of the seat back,
    wherein the display further comprises a grappling claw that projects toward a side opposite to the monitor of the display, and
    wherein when the display is slid to outside of the seat back from the inside of the seat back, the grappling claw of the display interferes with a part of the seat back in an interference state, and when the slide base is further slid from the inside of the seat back to the outside thereof, the display is tilted with respect to the slide base toward the head rest side by operation of the biased hinge while the grappling claw is maintained in the interference state.

10. The display device of the vehicle seat according to claim 9, wherein the display is assembled to the slide base in a state of being biased toward a side opposite to the head rest.

11. The display device of the vehicle seat according to claim 9, wherein the slide base is configured to slide the display toward the outside of the seat back, and wherein the display is slidable and tiltable when the slide base is moved in a single direction.

12. The display device of the vehicle seat according to claim 9, wherein an axis around which the display is tilted is slidable by the sliding mechanism.

* * * * *

UNITED STATES PATENT AND TRADEMARK OFFICE
CERTIFICATE OF CORRECTION

PATENT NO. : 8,388,061 B2
APPLICATION NO. : 12/755545
DATED : March 5, 2013
INVENTOR(S) : Y. Saito et al.

It is certified that error appears in the above-identified patent and that said Letters Patent is hereby corrected as shown below:

In the Claims:

Column 7, line 39 (claim 4, line 9) delete "which is" after member.

Column 7, line 46 (claim 4, line 16) insert -- to -- after grappled.

Signed and Sealed this
Second Day of July, 2013

Teresa Stanek Rea
*Acting Director of the United States Patent and Trademark Office*